United States Patent Office  3,528,642
Patented Sept. 15, 1970

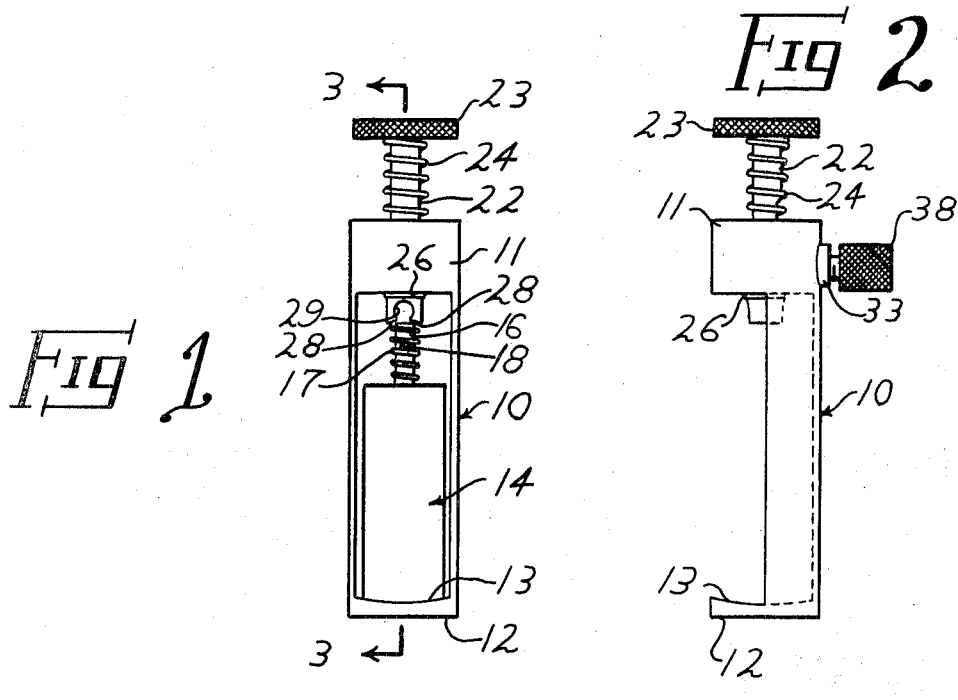
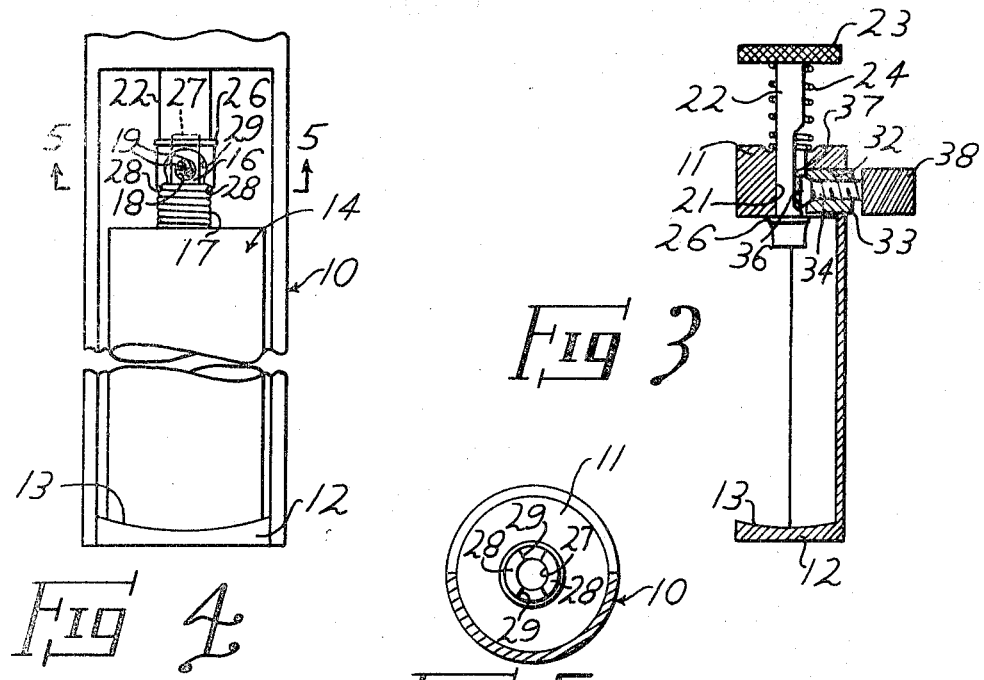

3,528,642
TOOL FOR DEPRESSING SPRING SURROUNDING TERMINAL OF CONDENSER
Daniel R. Moody, 1564 Pearson Ave. 35211, and Cyril U. Smith, 200 E. Edgewood Drive 35209, both of Birmingham, Ala.
Filed June 26, 1968, Ser. No. 740,148
Int. Cl. B60p 1/48
U.S. Cl. 254—10.5                                9 Claims

ABSTRACT OF THE DISCLOSURE

Tool for depressing compression spring surrounding terminal of electrical condenser embodying a housing having lower transverse member engaging condenser and upper transverse member carrying movable actuating member extending toward terminal. Recess in lower end of actuating member receives terminal while lower portion thereof engages and depresses spring below opening in terminal. Releasable means holds actuating member at selected positions and concave surfaces facilitate insertion and retaining condenser in place.

BACKGROUND OF THE INVENTION

This invention relates to a tool for depressing a spring surrounding the terminal of an electrical condenser and more particularly to such a tool which retains the spring in a compressed position relative to a transverse opening through the terminal until a conductor is inserted into the transverse opening.

Heretofore in the art to which our invention relates, difficulties have been encountered in inserting wires into the transverse opening provided in an electrical condenser for motors, such as lawn mower motors and the like due to the fact that such wires are held in assembled position by a compression spring which surrounds the terminal of the condenser between the condenser body and the wires inserted into the transverse opening. That is, the mechanic must hold the spring in a compressed condition with one hand and then attempt to insert the wires in the transverse opening in the terminal with the other hand. Cap-like depresser tools have been proposed which permit the compression spring to be compressed upon insertion of the cap over the terminal and then depressing the spring with the cap member. However, such depresser tools slip relative to the terminal and the spring whereby the spring is often released accidentally and is thus lost due to the fact that the stored energy in the spring causes the spring to be ejected through the air a substantial distance from the work area. Furthermore, improper connections between the wires or conductors and the terminal of the condenser are often made due to the fact that the compression springs are not compressed sufficiently for proper insertion of the wire conductors.

BRIEF SUMMARY OF INVENTION

To overcome the above and other difficulties, we provide a tool for depressing the compression springs surrounding the terminal of an electrical conductor, together with means for retaining the compression spring in the compressed condition until the wire conductors are properly installed. After installation of the conductors, the spring is released for engagement with the conductor whereupon the tool is then easily removed from the condenser. The condenser is supported within a housing having a lower transverse member which engages the bottom of the condenser and an upper transverse member which supports a movable element which is adapted to move into engagement with the spring while the terminal moves inwardly thereof to thus compress the spring and at the same time retain the condenser in place. Releasable means hold the movable member at selected positions whereby the compression spring may be held in the compressed position for any desired period of time for proper installation of the conductor wires.

Apparatus embodying features of our invention is illustrated in the accompanying drawing, forming a part of this application, in which:

FIG. 1 is a front elevational view of the apparatus showing a condenser in place with its compression spring in the extended position;

FIG. 2 is a side elevational view of the apparatus shown in FIG. 1, the condenser being omitted;

FIG. 3 is a sectional view taken generally along the line 3—3 of FIG. 1, the condenser being omitted;

FIG. 4 is an enlarged, fragmental view, partly broken away, showing the compression spring of the condenser in the compressed condition; and, FIG. 5 is a sectional view taken generally along the line 5—5 of FIG. 4 with the condenser element being omitted for the sake of clarity.

Referring now to the drawing for a better understanding of our invention, we show a housing 10 which is generally semi-cylindrical, as shown in FIGS. 2 and 5, and is provided with an upper transverse member 11 and a lower transverse member 12. The lower transverse member 12 is provided with a concave upper surface 13 for receiving the lower end of an electrical condenser 14 having an upstanding terminal 16. As shown in FIGS. 1 and 4, the terminal 16 is surrounded by a compression spring 17 which is adapted to be compressed beneath a transverse opening 18 provided in the terminal 16 for receiving conductor wires 19 in a manner well understood in the art to which our invention relates.

As shown in FIG. 3, a vertically extending opening 21 is provided in the upper transverse member 11 for slidably receiving an elongated actuating member 22 having a control knob 23 at the upper end thereof. A compression spring 24 surrounds the actuating member 22 intermediate the knob 23 and the upper surface of the transverse member 21. An annular shoulder 26 is provided on the actuating member in position to engage the under surface of the upper transverse member 11 to limit outward movement of the actuating member.

As shown in FIGS. 1, 4 and 5, the lower end of the actuating member 22 is provided with an axially extending recess 27 therein for receiving the upper end of the terminal 16 as it moves to the position shown in FIG. 4. That is, the recess 27 is of a size and length to receive the upper end of the terminal 16 as the compression spring 17 is compressed by arcuate contact surfaces 28 provided at the lowermost end of the actuating member 22. Oppositely disposed, downwardly opening passageways 29 are provided in the lowermost portion of the elongated actuating member 22, as shown in FIGS. 1, 4 and 5, whereby the wire conductors 19 may be inserted into the transverse opening 18 upon depression of the compression spring 17 to the position shown in FIG. 4. The under surfaces of the arcuate contact member 28 slope inwardly toward the recess 27 to retain the spring 17 in place, as shown.

As shown in FIG. 3, the transverse member 11 is provided with an opening 32 therein for receiving a sleeve member 33 which is threaded internally for receiving an externally threaded member 34 having an outwardly flaring inner end 36 which is adapted to move from the solid line position shown in FIG. 3 to the dotted line position. The side of the elongated actuating member 22 adjacent the member 36 is cut away to provide a flat portion 37 which is engaged by the flat face of the member 36 when moved to the dotted line position shown in FIG. 3. Accordingly, the member 36 not only limits rotation of the elongated actuating member 22 but also holds the elongated member 22 at selected positions whereby the spring 17 may be held in the fully compressed position, as shown in FIG. 4, for any desired length of time. An opening knob 38 is provided on the threaded member 34 for rotating the same.

From the foregoing description, the operation of our improved tool for depressing the compression spring surrounding the terminal of an electrical condenser will be readily understood. The condenser 14 is inserted in the housing 10 with the bottom of the condenser 14 resting on the concave surface 13 with the upper end of the terminal 16 subjacent the elongated actuating member 22, as shown in FIG. 1. The flat surface 37 on the member 22 engages the flat surface of the member 36 to limit rotation of the member 22 whereby the laterally opening passageways 29 are always held in proper position for alignment with the openings 18 when the condenser 14 is inserted in the position shown in FIGS. 1 and 4 with the opening 18 therein facing the operator. With the condenser properly positioned in the housing 10, the knob 23 is depressed whereby the actuating member 22 moves from the position shown in FIG. 1 to the position shown in FIG. 4 whereby the upper end of the terminal 16 enters the recess 27 and the lower concave surfaces 28 of the actuating member 22 engage the spring 17 to compress the same to the position shown in FIG. 4. With the spring 17 thus compressed, the knob 38 is rotated to force the member 36 into locking engagement with the flat surface 37 whereby the compression spring 17 is retained at a point below the opening 18 with the downwardly opening passageways 29 in alignment with the opening 18. The conductor wires 19 are then inserted through the passageways 19 and the transverse opening 18 in the terminal 16. Upon properly inserting the wires 19, the knob 38 is rotated to release the actuating member 22 whereupon the spring 24 returns the actuating member 22 to the raised position shown in FIG. 1. The condenser 14 with the wire conductors 19 thus properly installed is removed from the housing.

From the foregoing, it will be seen that we have devised an improved tool for depressing a compression spring surrounding an elongated terminal of an electrical condenser. By providing positive means for confining the condenser as the spring is compressed, together with means for holding the spring in compressed position with the transverse opening in the terminal exposed, the conductor wires may be properly installed with a minimum of effort and without danger of accidental release of the spring, thus providing safer operating conditions. Also, by providing a concave under surface for the portions of the actuating member which engage the upper end of the spring, the spring is held in a concentric position relative to the terminal 16 and at the same time the inclined surfaces 28 guide the terminal 16 into the recess 27. Furthermore, by providing the concave surface 13 on the lower transverse member 12 for engaging the bottom of the condenser 14, the condenser is retained within the housing 10 and has no tendency of moving outwardly thereof as force is applied to compress the spring around the terminal of the condenser.

While we have shown our invention in but one form, it will be obvious to those skilled in the art that it is not so limited, but is susceptible of various other changes and modifications without departing from the spirit thereof.

What we claim is:

1. In apparatus for depressing a compression spring surrounding an elongated terminal carried by one end of an electrical condenser, said terminal having a transverse opening therein for receiving at least one electrical conductor after depression of said spring:
    (a) a housing having an upper transverse member and a lower transverse member spaced from each other a distance to receive a condenser therebetween with said one end of the condenser carrying said terminal being spaced from said upper transverse members and the other end of said condenser engaging said lower transverse member,
    (b) there being an opening through said upper transverse member,
    (c) an elongated actuating member having one end extending through said opening in said upper transverse member and disposed for longitudinal movement relative thereto,
    (d) there being a recess in said one end of the actuating member of a size to receive the end of said terminal outwardly of the spring to be depressed so that a portion of said one end of the actuating member engages said spring to depress said spring upon downward movement of said actuating member, and
    (e) there being at least one downwardly opening laterally disposed passageway in said one end of the actuating member positioned to move into alignment with said transverse opening in said terminal after said spring is depressed below said transverse opening so that a conductor may be inserted through said passageway into said transverse opening in the terminal while said spring is depressed whereby upon release of said spring the conductor is urged by said spring into engagement with said terminal.

2. Apparatus as defined in claim 1 in which the housing comprises a generally semi-cylindrical member connected at one end thereof to said upper transverse member and connected at the other end thereof to said lower transverse member.

3. Apparatus as defined in claim 1 in which a pair of oppositely disposed passageways are provided in said one end of said actuating member at opposite sides of said recess for receiving a conductor extending through said transverse opening in the terminal after depression of the compression spring below said transverse opening.

4. Apparatus as defined in claim 1 in which the under surface of said portion of said one end of the actuating member which engages said spring slopes inwardly toward said recess in said actuating member to guide the terminal of a condenser into said recess.

5. Apparatus as defined in claim 1 in which the upper surface of said lower transverse member is concave.

6. Apparatus as defined in claim 1 in which the elongated actuating member is held at selected longitudinal positions relative to said upper transverse member by means comprising:
    (a) there being a transversely extending threaded opening in said transverse upper member communicating with said opening through said upper transverse member,
    (b) an externally threaded member in threaded engagement with said threaded opening and having an inner end disposed to engage a side of said elongated actuating member to retain said actuating member at selected longitudinal positions, and
    (c) means adjacent the outer end of said externally threaded member for rotating the same.

7. Apparatus as defined in claim 6 in which the side of said elongated actuating member engaged by said externally threaded member and the adjacent end of said externally threaded member are both relatively flat to limit rotation of said actuating member as it moves relative to said externally threaded member.

8. Apparatus as defined in claim 1 in which the end of said elongated actuating member extending outwardly of of said upper transverse member is provided with a knob for depressing the same.

9. Apparatus as defined in claim 8 in which a compression spring surrounds said actuating member between said upper transverse member and said knob.

References Cited

UNITED STATES PATENTS 1,389,657   9/1921   Harsley et al.
1,485,593   3/1924   Carricart.

ROBERT C. RIORDON, Primary Examiner

D. R. MELTON, Assistant Examiner